United States Patent
Powell

(10) Patent No.: US 9,697,392 B2
(45) Date of Patent: Jul. 4, 2017

(54) READER AND METHOD FOR READING DATA

(71) Applicant: MALPURE PTY LTD, Canning Vale (AU)

(72) Inventor: George Leonard Powell, Canning Vale (AU)

(73) Assignee: MALPURE PTY LTD, Canning Vale (AU)

(*) Notice: Subject to any disclaimer, the term of this patent is extended or adjusted under 35 U.S.C. 154(b) by 0 days.

(21) Appl. No.: 14/773,442

(22) PCT Filed: Mar. 7, 2014

(86) PCT No.: PCT/AU2014/000226
§ 371 (c)(1),
(2) Date: Sep. 8, 2015

(87) PCT Pub. No.: WO2014/134686
PCT Pub. Date: Sep. 12, 2014

(65) Prior Publication Data
US 2016/0019404 A1    Jan. 21, 2016

(30) Foreign Application Priority Data
Mar. 7, 2013  (AU) .................................. 2013201357

(51) Int. Cl.
*H04Q 5/22* (2006.01)
*G06K 7/10* (2006.01)

(52) U.S. Cl.
CPC ..... *G06K 7/10128* (2013.01); *G06K 7/10207* (2013.01)

(58) Field of Classification Search
CPC .................. G06K 7/10128; G06K 7/10207
See application file for complete search history.

(56) References Cited

U.S. PATENT DOCUMENTS 7,196,613 B2    3/2007  Horwitz et al.
7,557,708 B1 *  7/2009  Pacholok ............. G06K 7/0008
                                                       219/600

(Continued)

FOREIGN PATENT DOCUMENTS

DE    102009037168 A1    2/2011
EP        0944014 A2    9/1999

(Continued)

OTHER PUBLICATIONS

International Search Report issued in PCT/AU2014/000226 dated May 20, 2014.

(Continued)

*Primary Examiner* — Erin File
(74) *Attorney, Agent, or Firm* — Marshall, Gerstein & Borun LLP

(57) ABSTRACT

A reader (112) for reading data, the data being associated with a radio frequency identification ("RFID") tag (16) and carried by a data signal originating from the RFID tag, the reader (112) comprising processing means (118) and storage means, the storage means having instructions stored thereon, whereby the processing means (118) is operable, under control of the instructions, to periodically switch the reader (112) from a first state to a second state; wherein, when the reader (112) is in the second state, the reader (112) is operable to determine an occurrence of a tag present event corresponding to the presence of an RFID tag within a field generated to activate an RFID tag to transmit a respective data signal carrying data associated with the RFID tag, and one or more other events; following determination of the one or more other events, return the reader to the first state; and following determination of the tag present event, receive and store in the storage means a representation of the data signal originating from the RFID tag, process the RFID tag signal (Continued)

Simplified Tag Block Schemat representation to determine the data signal, and read the data of the determined data signal.

19 Claims, 5 Drawing Sheets

(56) References Cited

U.S. PATENT DOCUMENTS

| | | | |
|---|---|---|---|
| 2006/0132302 A1* | 6/2006 | Stilp | G05B 9/03 340/539.22 |
| 2008/0272888 A1 | 11/2008 | Cardwell et al. | |
| 2011/0163850 A1* | 7/2011 | Bachman | G06K 19/0702 340/10.1 |
| 2011/0305369 A1* | 12/2011 | Bentley | G06K 9/00342 382/103 |
| 2012/0086554 A1* | 4/2012 | Wilkinson | G06K 7/10138 340/10.1 |
| 2015/0187234 A1* | 7/2015 | Atkinson | G06K 19/06028 40/5 |
| 2015/0310771 A1* | 10/2015 | Atkinson | G09F 3/0297 40/5 |
| 2016/0212103 A1* | 7/2016 | Rhoads | H04L 63/0428 |
| 2016/0224828 A1* | 8/2016 | Bose | G06K 9/00342 348/77 |
| 2016/0227598 A1* | 8/2016 | Singh | H04W 76/027 455/450 |

FOREIGN PATENT DOCUMENTS

| | | |
|---|---|---|
| WO | WO-2004/019184 A2 | 3/2004 |
| WO | WO-2007/106231 A2 | 9/2007 |
| WO | WO-2012/048001 A2 | 4/2012 |
| WO | WO-2012/067790 A1 | 5/2012 |
| WO | WO-2013/008886 A1 | 1/2013 |

OTHER PUBLICATIONS

Written Opinion issued in PCT/AU2014/000226 dated May 20, 2014.

Examination Report issued in Australian Patent Application No. 2013201357 dated May 24, 2014.

Extended European Search Report issued in European Patent Application No. 14760026.6 dated Jul. 29, 2016.

* cited by examiner

READER AND METHOD FOR READING DATA

TECHNICAL FIELD

The present invention relates generally to a reader and method for reading data.

Although the present invention will be described with particular reference to a single card reader of a radio frequency identification ("RFID") system utilising ordinary RFID cards or tags, it will be appreciated that the present invention may be used in respect of anti-collision readers operable to simultaneously read data of a plurality of RFID tags or cards.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

BACKGROUND ART

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

RFID involves readers (also referred to as interrogators) and tags (also referred to as cards or labels). RFID tags are devices operable to send data such as, for example, an identification (a "tag ID") to an RFID, reader for identification purposes.

In operation, a reader will attempt to communicate with a tag within the reader's transmission area or field. The reader is operable to transmit a predetermined signal (in the transmission area or field) and then monitors the signal. A tag responding to the signal is operable to modulate it in a predetermined manner which is identified by the reader.

FIG. 1 of the drawings depicts a conventional arrangement of an RFID system 10 comprising a typical low frequency (125 KHz) RFID reader 12 having a tuned loop reader antenna 14 operable to receive a response signal from a typical tag 16. FIGS. 2A and 2B of the drawings depict simplified block diagrams for the reader 12 and the tag 16, respectively.

The reader 12 comprises a reader microprocessor 18 operable to provide a stable 125 KHz reference frequency from an onboard pulse-width modulation ("PWM") output. This is amplified by an un-modulated RF reader amplifier 20 and used to power the reader antenna 14 at a frequency of 125 KHz. Current in the loop of the reader antenna 14 generates an inductive alternating current ("AC") field around the loop. Also connected to the loop of the reader antenna 14 is an envelope detector 22, the simplest of which may have the form of a diode detector. Output from the envelope detector 22 is presented to a detector amplifier 24. This is depicted in FIG. 2A as being operably connected or going to an analog-to-digital converter ("ADC") 26, but its output could be taken to a comparator in simple readers. The components of the reader 12 are operably connected such that any signal modulation that appears on the tuned loop of the reader antenna 14 will be detected and amplified.

The tag 16 comprises a tuned loop tag antenna 28 operably coupled to a tuned circuit. A tag rectifier 30 is provided and is operable to tap off some of the power in the tuned circuit to power or run a tag microchip 32. The tag 16 further comprises a clock extractor 34 operable to divide the RF frequency by a factor, which may be, for example, 32, to provide an output data rate, a 64 bit shift register 36 containing the tag data, and a tag modulator 38 operable to modulate the tuned loop of the tag antenna 28. When the tag 16 is placed in an RF field (such as the transmission area or field) generated by the reader 12, a voltage on the tuned circuit of the tag 16 increases or builds up until the tag rectifier 30 is operable to supply enough power for the tag microchip 32 to work or function, that is energize the tag 16. A typical tag will have 64 bits of stored data in the shift register 36, although there are many different tags available with memories storing varied amounts of data from just a few bits to many thousands of bits. For a better understanding, the tag may use the clock extractor 34 to divide down the 125 KHz frequency by 32 and use this as a reference frequency. Typically this reference frequency can be used as a clock to rotate the shift register 36 containing the tag data, such as the tag ID. The shift register 36 is arranged to rotate the 64 bits of data around and around in a continuous loop. A serial output of the shift register 36 is used to modulate RF voltage on the receiver coil of the tag 16. The data is usually converted into Manchester or Bi-phase encoding to ensure that the signal has no direct current ("DC") component. A typical waveform in this regard is depicted in FIG. 3 of the drawings.

The tuned loop of the tag antenna 28 is coupled into the tuned loop of the reader antenna 14 such that the modulation of the tag 16 also appears on the tuned loop of the reader antenna. This modulated signal can be several tens of µV to several tens of mV depending on the distance between the tag 16 and the reader 12. By operation of the envelope detector 22 and detector amplifier 24 of the reader 12, the signal is detected and amplified and presented to the ADC 26 and then subsequently to the microprocessor 18. Many microprocessors have internal ADCs. In a normal or traditional (non-anti-collision system) tag reader, the analog to digital is used to detect when the signal is positive or negative compared to a no signal voltage, allowing for the received tag data to be decoded back, from the encoded Manchester code, for example, to raw data. Many readers also use a standard integrated circuit ("IC") comparator in this position and present the output to a microprocessor port for decoding and processing.

Often the detected signal is amplified until it limits, rail to rail, and this can make detection easier. Typically the received waveform can be compared to a centre rest voltage with a comparator or digitally using an ADC and subtracting samples. The timings between switching are compared and the associated bit, '0' or '1', chosen that corresponds best to the particular encoding of the tag data.

As a general rule, an RFID system such as that described above works well. Cards or tags and readers are typically inexpensive and to date, this system is the widest in use of all card/tag systems and is used for many applications, including asset tracking, door entry, logistics, and maintenance.

Modern 125 kHz RFID readers consume relatively low power compared to their counterparts a decade ago. This has been due to steady improvements in technology including, for example, processor efficiency, operational amplifiers and RF power semiconductors.

However, improvements in power consumption have now leveled off so that significant reductions below the current level are unlikely to be achieved using prior art technology and methods, especially since the bulk of the power consumed in present day RFID readers is used to drive the search coil and this cannot be reduced without increasing the Q of the search coil of the reader and this raises other problems, none the least cost.

Additionally, present day power levels are still preventing the extension of RFID technology to new areas. Applications remain largely the same as they did a decade ago because RFID readers are constrained by the use of mains powered supplies, or in the case of portable readers, batteries with considerable power reserves.

To permit applications that are powered by inexpensive solar cells or by lithium coin cells, present-day power levels present a formidable barrier. For example, a typical reader will run at 12V and draw 40 mA using 400 mW-500 mW of power. At this rate, four off lithium CR2477 1000 mA/hr coin cells would last just one day, and this is nowhere near the duration required or desired, such as at least a year or so, that would be acceptable for installations, such as sheds, safes, medical cabinets, boats, caravans and the like. Improvements in the order of at least 100× are predicted to be required before the technology can really make significant inroads into these areas.

It is against this background that the present invention has been developed.

SUMMARY OF INVENTION

It is an object of the present invention to overcome, or at least ameliorate, one or more of the deficiencies of the prior art mentioned above, or to provide the consumer with a useful or commercial choice.

Preferred embodiments of the invention seek to greatly reduce the power consumption of RFID readers, and so extend their use to applications where extremely low power is essential.

Other objects and advantages of the present invention will become apparent from the following description, taken in connection with the accompanying drawings, wherein, by way of illustration and example, preferred embodiments of the present invention are disclosed.

According to a first broad aspect of the present invention, there is provided a reader for reading data, the data being associated with a radio frequency identification ("RFID") tag and carried by a data signal originating from the RFID tag, the reader comprising processing means and storage means, the storage means having instructions stored thereon, whereby the processing means is operable, under control of the instructions, to:

periodically switch the reader from a first state to a second state;

wherein, when the reader is in the second state, the reader is operable to determine an occurrence of a tag present event corresponding to the presence of an RFID tag within a field generated to activate an RFID tag to transmit a respective data signal carrying data associated with the RFID tag, and one or more other events;

following determination of the one or more other events, return the reader to the first state; and following determination of the tag present event, receive and store in the storage means a representation of the data signal originating from the RFID tag, process the RFID tag signal representation to determine the data signal, and read the data of the determined data signal.

Preferably, the first state comprises a lower power mode of operation. In the lower power mode of operation, which may be a default or standard condition of the reader, less energy is used by the reader. In such a case, the reader may be a micro-power reader.

Preferably, the second state comprises a higher power mode of operation. In the higher power mode of operation, more energy is used by the reader than when it is in a lower power mode of operation.

Preferably, the one or more other events include an RFID tag not being present in the field.

To determine the occurrence of the tag present event or the one or more other events, the processing means is operable, under control of the instructions, to:

receive and store in the storage means a representation of at least a portion of a signal detected in the field over a duration of time; and process the detected signal representation.

The duration of time may be referred to as a sweep period or sweep.

Preferably, the detected signal representation is built up or created dynamically, on the fly. In this manner, it is a representation of a signal that is presently being detected in the field.

Processing the detected signal representation preferably comprises analysing the detected signal representation.

Preferably, the processing means comprises one or more analysis modules operable to perform the analysis of the detected signal representation.

Preferably, one or more reference representations each corresponding to a respective representation being expected on the occurrence of the tag present event or the one or more other events are stored in the storage means and accessible by the one or more analysis modules to determine the occurrence of the tag present event or the one or more other events.

The one or more reference representations may comprise: a first reference representation corresponding to an expected representation when an RFID tag is present in the field; a second reference representation corresponding to an expected representation of an event comprising an RFID tag not being present in the field; and one or more other reference representations corresponding to respective representations of one or more other events occurring in the field.

The reference representations may be temporarily or permanently stored in the storage means.

The expected representations for each of the one or more reference representations may correspond to a duration of time commencing from when the field is generated (i.e. RF on) and extending a complete data transmission time. This duration of time may correspond to the sweep period or sweep.

Preferable, the RFID tag signal representation, detected signal representation, and/or one or more reference representations comprise a waveform or samples of a waveform. The samples may comprise digital samples, in which case the Waveforms may comprise signal bit pattern waveforms.

Preferably, the reader comprises an RF field generator operable to generate the field.

Preferably, the processing means is operable, under control of the instructions, to control the field generated by the field generator.

This control may include periodically activating and deactivating the field generator (i.e. switching it "on" and "off") according to whether the reader is in the first state or the second state.

The control may also include activating the field generator for a duration of time when there is no RFID tag present in the field (and hence no data signal originating from the RFID tag). In such a case, the processing means may be further operable, under control of the instructions, to receive and store in the storage means a representation of at least a portion of a signal detected in the field over the duration of time as the second reference representation.

Preferably, the processing means is operable, under control of the instructions, to subtract the detected signal representation (i.e. of present sweep) from the second reference representation (corresponding to a no-tag sweep) to generate a modified or resultant representation, and to store the resultant representation separately in the storage means. Preferably, the subtraction (and creation of the resultant representation) occurs dynamically, on the fly.

Preferably, the processing means is operable, under control of the instructions, to process the resultant representation as it is being build up or created, to determine at an early stage if the resultant representation is substantially zero, indicating that there is no RFID tag present in the field, or if the resultant representation is not substantially zero, indicating an anomaly in the field that may be related to the presence of an RFID tag. If a determination is made that there is no RFID tag present in the field, then the processing means is operable, under control of the instructions, to switch the reader to the first state (aborting the sweep). If an anomaly is detected, then the processing means is operable, under control of the instructions, to continue the detection (i.e. the present sweep).

Preferably, when an anomaly is detected, the processing means is operable, under control of the instructions, to further analyse the resultant representation as it continues to be build up or created, to determine a cause of the anomaly. If a determination is made that the anomaly was caused by interference (i.e. there is no RFID tag present in the field), then the processing means is operable, under control of the instructions, to switch the reader to the first state (aborting the sweep). If it is determined that the anomaly was likely caused by the presence of an RFID tag in the field, then the processing means is operable, under control of the instructions, to continue the detection (i.e. the present, sweep).

Preferably, when it has been determined that it is likely that an RFID tag is present in the field, the processing means is operable, under control of the instructions, to further process the resultant representation as it continues to be build up or created towards being a complete or full resultant representation, to further analyse the partial resultant to retrieve the data signal, and read the data of the determined data signal dynamically, on the fly, to determine if the data is corrupt. If a determination is made that the data is corrupt, then the processing means is operable, under control of the instructions, to switch the reader to the first state (aborting the sweep). If it is determined that the data is not corrupt, then the processing means is operable, under control of the instructions, to continue the detection (i.e. the present sweep) until the full data of the RFID tag has been transmitted and a complete or full resultant representation formed corresponding to the RFID tag signal representation.

Preferably, once data of an RFID tag present in the field has been read, the processing means is operable, under control of the instructions, to perform a stationary tag detection analysis to determine if the read RFID tag is stationary. This may be implemented by comparing a plurality of sequential detected signal representations over time. If there is substantially no charge in the sequentially detected signal representations (indicating that the read RFID tag is stationary in the field), then the processing means is operable, under control of the instructions, to store, preferably temporarily, in the storage means a representative one of the sequentially detected signal representations as a third reference representation corresponding to a stationary RFID tag event.

Preferably, to determine if one or more additional RFID tags are introduced into the field, and to read their associated data, whilst a first read RFID tag is stationary in the field, the processing means is operable, under control of the instructions, to perform the processes as hereinbefore described using the third reference representation rather than the second reference representation.

Preferably, the processing means, under control of the instructions, is operable to perform a comparison analysis, wherein a detected signal representation for a current sweep is compared with both a reference representation and a detected signal representation from the immediately preceding sweep.

Preferably, the processing means is operable, under control of the instructions, to process the resultant representation as it is being build up or created, to perform a pattern detection analysis to determine if the resultant representation contains a prescribed pattern.

The prescribed pattern may be a typical or expected bit pattern for the RFID tag intended to be read. In such a case, the pattern detection analysis may comprise assigning a weighting of the closeness of a bit pattern match between a bit pattern of the resultant representation and the typical RFID tag bit pattern, and other factors including, for example, signal duration and signal magnitude, to determine if the resultant representation is indicative of noise (and that there is no RFID tag present in the field), or is indicative of an RFID tag being present in the field. If a determination is made that there is no RFID tag present in the field, then the processing means is operable, under control of the instructions, to switch the reader to the first state (aborting the sweep). If the analysis distinguishes the signal from noise, then the processing means is operable, under control of the instructions, to continue the detection (i.e. the present sweep).

Preferably, once data associated with an RFID tag has been read, the processing means is operable, under control of the instructions, to create and store a typical or expected bit pattern waveform in digital form for the RFID tag on the basis of the read data. This may be done by sequencing the RFID tag signal data to the RFID tag bit sequence and normalizing the amplitude of the signal to generate an associated typical bit pattern, and storing the associated typical bit pattern in the storage means. It may be stored temporarily, or as a replacement for an existing RFID typical bit pattern previously stored.

Preferably, the reader comprises RF detection means operable to detect a signal in the field, and associated signal amplification means, and the processing means comprises analog-to-digital conversion (ADC) means, and digital-to-analog conversion (DAC) means for processing the detected signal. The RF detection means, the signal amplification means, the ADC means, and/or the DAC means may be selectively activated (powered up) and deactivated (powered down) as required according to the state of the reader. Such activation and deactivation may be initiated by the processing means, under control of the instructions.

Preferably, the processing means, under control of the instructions, is operable to sequence the DAC means to create or generate an output signal for injection at an appropriate stage or point with the signal amplification means to cancel to at least some extent undesirable effects including intrinsic amplifier bounce and saturation that occur when the field generator and the amplification means are activated (first turned on).

More preferably, the injected output signal will also cancel any or at least part of a contribution due to one or more stationary RFID tags being present in the field during construction of a reference representation.

Preferably, the signal amplification means is operable to produce an increase in power (i.e. a power boost) at the start of a sweep.

Preferably, the signal amplification means is operable to perform logarithmic operation to reduce saturation effects.

Preferably, the data associated with the RFID tag comprises at least one error-detecting code, and may comprise an additional error detecting code. The error-detecting code may comprise or be modelled on at least one of Manchester encoding, including 64 bit Manchester encoding, or a similar type such as one employing bi-phase modulation encoding. The additional error-detecting code may comprise a cyclic redundancy check (CRC) either within the data itself or encoded by rotation of an ID string during programming time.

Preferably, the data associated with the RFID tag comprises a data string that is repeated, preferably endlessly, during normal operating conditions and is at least substantially indistinguishable from a data string transmitted from a normal or typical RFID tag comprising the error detecting code, and which comprises string rotation from which, at least when the reader switches to the second state, additional data and/or information can be recovered.

Preferably, the data associated with the RFID tag emulates Manchester encoding using direct modulation, so that partial, less than one bit, rotations are effected, using preferably 128, 256 or more, memory positions to effect fractional bit rotation, such that the data string is repeated, preferably endlessly, during normal operating conditions and is at least substantially indistinguishable from a data string transmitted from a typical RFID tag comprising the error detecting code, such that, at least when the reader switches to the second state, additional data and/or information can be recovered.

The additional data and/or information may correspond to extra bits.

Preferably, the processing means, under control of the instructions, is operable to determine rotation of the data string of data associated with the RFID tag by timing the first transmission of data and/or from the position of a header in the string.

According to a second broad aspect of the present invention, there is provided a method for reading data, the data being associated with a radio frequency identification ("RFID") tag and carried by a data signal originating from the RFID tag, the method comprising:

periodically switching from a first stage to a second stage;
in the second stage, determining an occurrence of a tag present event corresponding to the presence of an RFID tag within a field generated to activate an RFID tag to transmit a respective data signal carrying data associated with the RFID tag, and one or more other events;
following determination of the one or more other events, returning to the first stage; and
following determination of the tag present event, receiving and storing a representation of the data signal originating from the RFID tag, processing the RFID tag signal representation to determine the data signal, and reading the data of the determined data signal.

Preferably, the first state comprises a lower power mode of operation, and the second state comprises a higher power mode of operation.

Preferably, the one or more other events include an RFID tag not being present in the field.

Preferably, determining the occurrence of the tag present event or the one or more other events comprises:
receiving and storing a representation of at least a portion of a signal detected in the field over a duration of time; and
processing the detected signal representation.

Preferably, the method comprises dynamically building up or creating the detected signal representation.

Preferably, processing the detected signal representation comprises analysing the detected signal representation.

Preferably, the method comprises performing the analysis of the detected signal representation using one or more analysis modules.

Preferably, the method comprises storing one or more reference representations each corresponding to a respective representation being expected on the occurrence of the tag present event or the one or more other events in a storage means accessible by the one or more analysis modules to determine the occurrence of the tag present event or the one or more other events.

Preferably the one or more reference representations comprise: a first reference representation corresponding to an expected representation when an RFID tag is present in the field; a second reference representation corresponding to an expected representation of an event comprising an RFID tag not being present in the field; and one or more other reference representations corresponding to respective representations of one or more other events occurring in the field.

Preferably, the expected representations for each of the one or more reference representations correspond to a duration of time commencing from when the field is generated and extending a complete data transmission time or sweep period or sweep.

Preferably, the representation(s) comprise a waveform or samples of a waveform.

Preferably, the method comprises generating the field using an RF field generator.

Preferable, the method comprises controlling the field generated by the field generator.

Preferably, the control comprises periodically activating and deactivating the field generator according to whether the reader is in the first state or the second state.

Preferably, the control comprises activating the field generator for a duration of time when there is no RFID tag present in the field, and receiving and storing a representation of at least a portion of a signal detected in the field over the duration of time as a second reference representation corresponding to an expected representation of an event comprising an RFID tag not being present in the field.

Preferably, the method comprises subtracting the detected signal representation of a present sweep from the second reference representation to generate a resultant representation, and separately storing the resultant representation.

Preferably, the method comprises dynamically subtracting and creating the resultant representation.

Preferably, the method comprises processing the resultant representation as it is being created, to determine at an early stage if the resultant representation is substantially zero, indicating that there is no RFID tag present in the field, or if the resultant representation is not substantially zero, indicating an anomaly in the field that may be related to the presence of an RFID tag.

Preferably, if a determination is made that there is no RFID tag present in the field, the method comprises switching to the first state, and if an anomaly is detected, continuing the detection.

Preferably, if an anomaly is detected, the method comprises further analysing the resultant representation as it continues to be created, to determine a cause of the anomaly.

Preferably, if a determination is made that the anomaly was caused by interference, the method comprises switching to the first state, and if a determination is made that the anomaly was likely caused by the presence of an RFID tag in the field, continuing the detection.

Preferably, if a determination is made that it is likely that an RFID tag is present in the field, the method comprises further processing the resultant representation as it continues to be created towards being a complete resultant representation, to further analyse the partial resultant to retrieve the data signal, and reading the data of the determined data signal dynamically to determine if the data is corrupt.

Preferably, if a determination is made that the data is corrupt, the method comprises switching to the first state, and if a determination is made that the data is not corrupt, continuing the detection until the full data of the RFID tag has been transmitted and a complete resultant representation formed corresponding to the RFID tag signal representation.

Preferably, once data of an RFID tag present in the field has been read, the method comprises performing a stationary tag detection analysis to determine if the read RFID tag is stationary.

Preferably, the stationary tag detection analysis comprises comparing a plurality of sequential detected signal representations over time, and if there is substantially no charge in the sequentially detected signal representations, indicating that the read RFID tag is stationary in the field, then the method comprises storing a representative one of the sequentially detected signal representations as a third reference representation corresponding to a stationary RFID tag event.

Preferably, the method comprises performing a comparison analysis, wherein a detected signal representation for a current sweep is compared with both a reference representation and a detected signal representation from the immediately preceding sweep.

Preferably, the method comprises processing the resultant representation as it is being build up or created, to perform a pattern detection analysis to determine if the resultant representation contains a prescribed pattern.

Preferably, the prescribed pattern comprises an expected bit pattern for an RFID tag intended to be read, and the pattern detection analysis comprises assigning a weighting of the closeness of a bit pattern match between a bit pattern of the resultant representation and the expected RFID tag bit pattern, to determine if the resultant representation is indicative of noise and that there is no RFID tag present in the field, or is indicative of an RFID tag being present in the field.

Preferably, if a determination is made that there is no RFID tag present in the field, then the method comprises switching to the first state, and if the analysis distinguishes the signal from noise, then continuing the detection.

Preferably, the pattern detection analysis comprises using one or more other factors including signal duration and signal magnitude.

Preferably, the method comprises, once data associated with an RFID tag has been read, creating and storing an expected bit pattern waveform in digital form for the RFID tag on the basis of the read data.

Preferably, creating the expected bit pattern waveform comprises sequencing the RFID tag signal data to the RFID tag bit sequence and normalising the amplitude of the signal to generate an associated typical bit pattern.

Preferably, the method comprises detecting a signal in the field using RF detection means and associated signal amplification means, and processing the detected signal using processing means comprising analog-to-digital conversion (ADC) means and digital-to-analog conversion (DAC) means.

Preferably, the method comprises selectively activating and deactivating the RF detection means, the signal amplification means, the ADC means, and/or the DAC means, as required according to the stage.

Preferably, the method comprises sequencing the DAC means to create or generate an output signal for injection at an appropriate stage with the signal amplification means to cancel to at least some extent undesirable effects occurring when the field generator and the amplification means are activated.

Preferably, the injected output signal will also cancel any or at least part of a contribution due to one or more stationary RFID tags being present in the field during construction of a reference representation.

Preferably, the method comprises using the signal amplification means to produce an increase in power at the start of a sweep.

Preferably, the method comprises using the signal amplification means to perform logarithmic operation to reduce saturation effects.

Preferably, the data associated with the RFID tag comprises an error-detecting code, and an additional error-detecting code.

Preferably, the error-detecting code comprises or is modelled on at least one of Manchester encoding, including 64 bit Manchester encoding, and bi-phase modulation encoding.

Preferably, the additional error-detecting code comprises a cyclic redundancy check (CRC) either within the data itself or encoded by rotation of an ID string during programming time.

Preferably, the data associated with the RFID tag comprises a data string that is repeated, preferably endlessly, during normal operation of the RFID tag and is at least substantially indistinguishable from a data string transmitted from a typical RFID tag comprising the error detecting code, and which comprises string rotation from which additional data and/or information can be recovered.

Preferably, the data associated with the RFID tag emulates Manchester encoding using direct modulation, so that partial, less than one bit, rotations are effected, using preferably 128, 256 or more, memory positions to effect fractional bit rotation, such that the data string is repeated, preferably endlessly, during normal operation of the RFID tag and is at least substantially indistinguishable from a data string transmitted from a typical RFID tag comprising the error detecting code, such that additional data and/or information can be recovered.

The additional data and/or information may correspond to extra bits.

Preferably, the method comprises determining rotation of the data string of data associated with the RFID tag by timing the first transmission of data and/or from the position of a header in the string.

According to a third broad aspect of the present invention, there is provided a computer-readable storage medium on which is stored instructions that, when executed by a computing means, causes the computing means to perform the method for reading data according to the second broad aspect of the present invention as hereinbefore described.

According to a fourth broad aspect of the present invention, there is provided a computing means programmed to carry out the method for reading data according to the second broad aspect of the present invention as hereinbefore described.

According to a fifth broad aspect of the present invention, there is provided an RFID tag for use with a reader according to the first broad aspect of the present invention as hereinbefore described and/or a method for reading data according to the second broad aspect of the present invention as hereinbefore described.

Preferably, the data associated with the tag comprises an error-detecting code, and an additional error-detecting code.

Preferably, the error-detecting code comprises or is modelled on at least one of Manchester encoding, including 64 bit Manchester encoding, and bi-phase modulation encoding.

Preferably, the additional error-detecting code comprises a cyclic redundancy check (CRC) either within the data itself or encoded by rotation of an ID string during programming time.

Preferably, the data associated with the tag comprises a data string that is repeated, preferably endlessly, during normal operation of the tag and is at least substantially indistinguishable from a data string transmitted from a typical tag comprising the error detecting code, and which comprises string rotation from which, at least when the reader switches to the second state, additional data and/or information can be recovered.

Preferably, the data associated with the tag emulates Manchester encoding using direct modulation, so that partial, less than one bit, rotations are effected, using preferably 128, 256 or more, memory positions to effect fractional bit rotation, such that the data string is repeated, preferably endlessly, during normal operation of the tag and is at least substantially indistinguishable from a data string transmitted from a typical tag comprising the error detecting code, such that, at least when the reader switches to the second state, additional data and/or information can be recovered.

Preferably, the additional data and/or information corresponds to extra bits.

According to a sixth broad aspect of the present invention, there is provided a method for associating data with a radio frequency identification ("RFID") tag and carried by a data signal originating from the RFID tag, the method comprising encoding the data using an error-detecting code, and an additional error detecting code.

Preferably, the error-detecting code comprises or is modelled on at least one of Manchester encoding, including 64 bit Manchester encoding, and bi-phase modulation encoding.

Preferably, the additional error-detecting code comprises a cyclic redundancy check (CRC) either within the data itself or encoded by rotation of an ID string during programming time.

Preferably, the data associated with the tag comprises a data string that is repeated, preferably endlessly, during normal operation of the tag and is at least substantially indistinguishable from a data string transmitted from a typical tag comprising the error detecting code, and which comprises string rotation from which additional data and/or information can be recovered.

Preferably, the data associated with the tag emulates Manchester encoding using direct modulation, so that partial, less than one bit, rotations are effected, using preferably 128, 256 or more, memory positions to effect fractional bit rotation, such that the data string is repeated, preferably endlessly, during normal operation of the tag and is at least substantially indistinguishable from a data string transmitted from a typical tag comprising the error detecting code, such that additional data and/or information can be recovered.

The additional data and/or information may correspond to extra bits.

According to a seventh broad aspect of the present invention, there is provided a system for reading a plurality of data, the system comprising a reader according to the first broad aspect of the present invention as hereinbefore described.

According to an eighth broad aspect of the present invention, there is provided a data signal encoding at least one command and being arranged to be receivable by at least one computing device, wherein, when the encoded command is executed on the computing device, the computing system performs the method for reading data according to the second broad aspect of the present invention as hereinbefore described.

BRIEF DESCRIPTION OF THE DRAWINGS

In order that the invention may be more fully understood and put into practice, a preferred embodiment thereof will now be described with reference to the accompanying drawings, in which.

DESCRIPTION OF EMBODIMENTS

Figure 1:
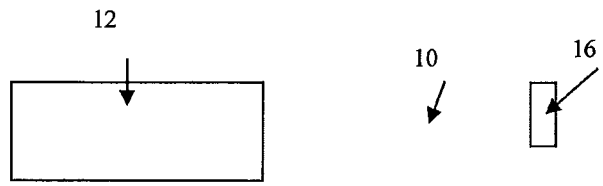
FIG. 1 depicts a conventional arrangement of a prior art RFID system.
Figure 2A:
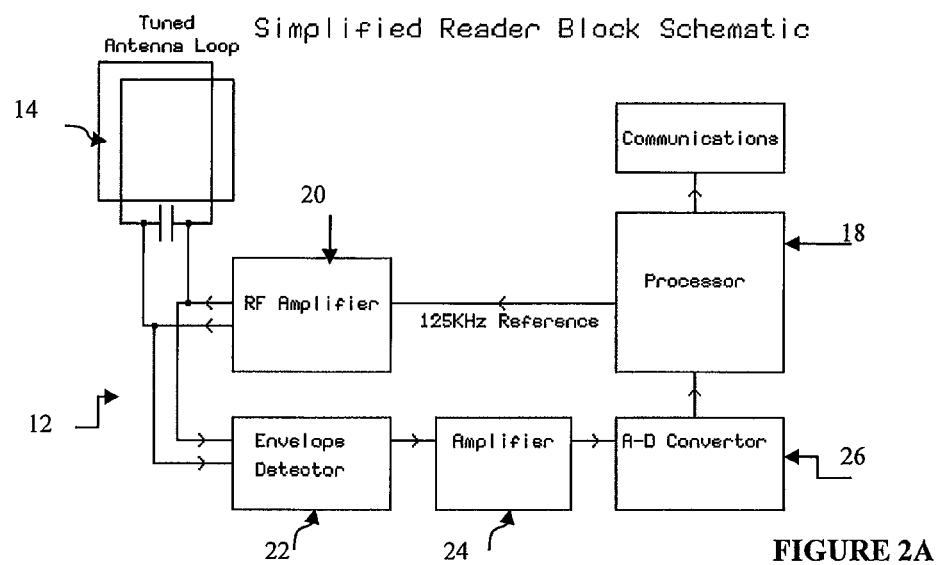
FIG. 2A depicts a block diagram of a reader of the prior art system depicted in FIG. 1.
Figure 2B:
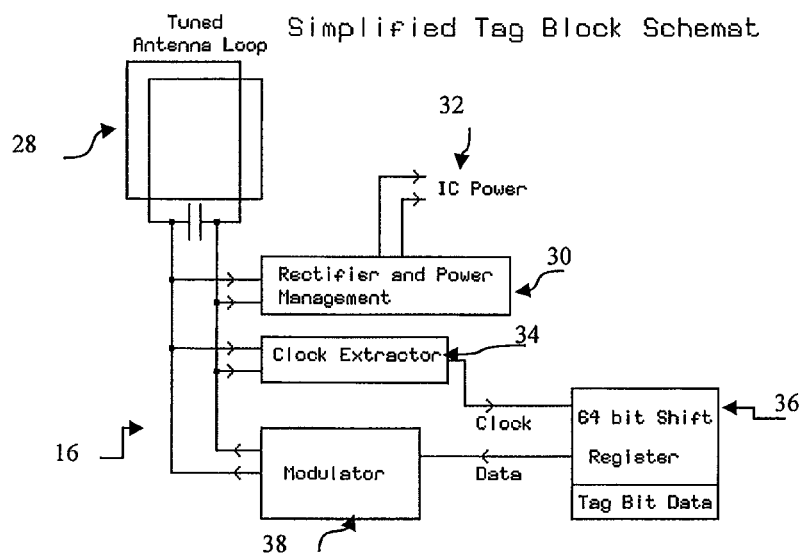
FIG. 2B depicts a block diagram of a tag of the prior art system depicted in FIG. 1.

Best Mode(s) for Carrying Out the Invention

In the drawings, like features have been referenced with like reference numbers.

Figure 5:
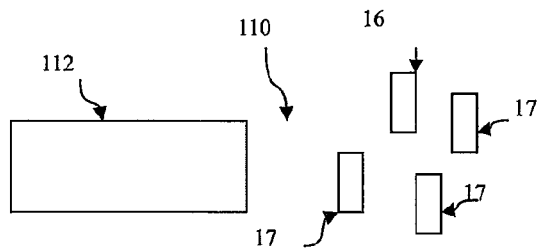
FIG. 5 depicts an embodiment of a system in accordance with an aspect of the present invention.

In FIG. 5, there is depicted an embodiment of a low power RFID system 110 in accordance with an aspect of the present invention.

The system 110 comprises a first module or device in the form of a low power RFID reader 112 and a plurality of second modules or devices each comprising a source having associated data in the form of RFID tags or cards 16. In the embodiment described, the tags 16 are ordinary or of conventional construction and operation, and function as hereinbefore described under the heading "Background Art". In alternative embodiments of the invention, the sources of data may comprise devices other than conventional RFID tags.

In the embodiment, the system 110 is for use with the popular EM4001 protocol and compatible tags. The invention is not limited in this regard, and in alternative embodiments, may be applied to and used in conjunction with other protocols and tag systems.

The data associated with each tag 16 is carried by or encoded by the tag 16 in a respective data signal originating from or generated by each tag 16. Particularly, each of the tags 16 contains 64 bits of data in storage means or memory comprising the shift register 36, transmitted as a modulated signal waveform via a communications device in the form of the tag antenna 28 when the tag 16 is located in an RF transmission area or field generated by the reader 112 and energized thereby.

Figure 6:
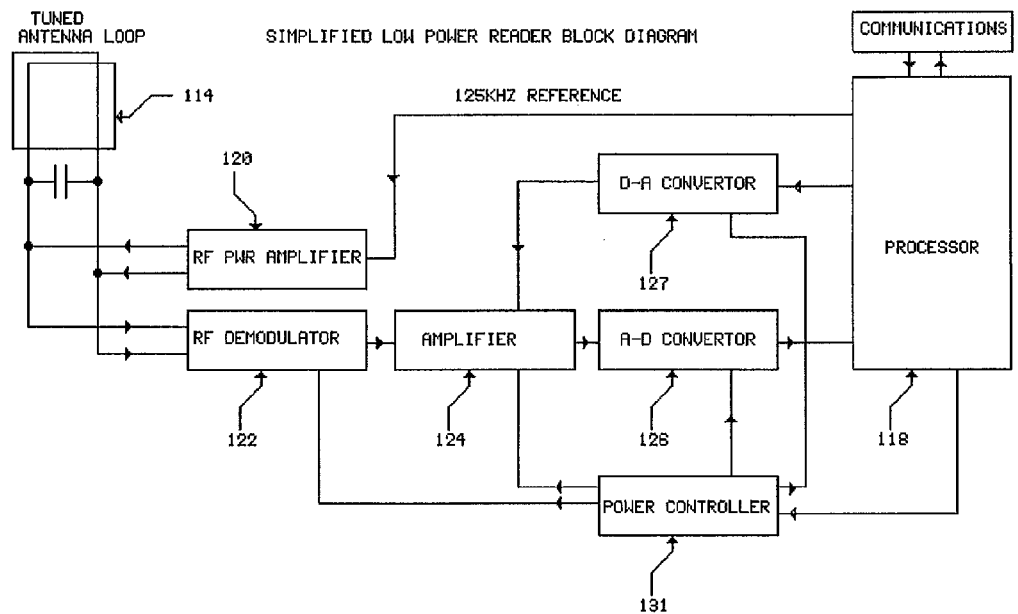
FIG. 6 depicts a block diagram of a reader of the system of FIG. 5.
Figure 7:
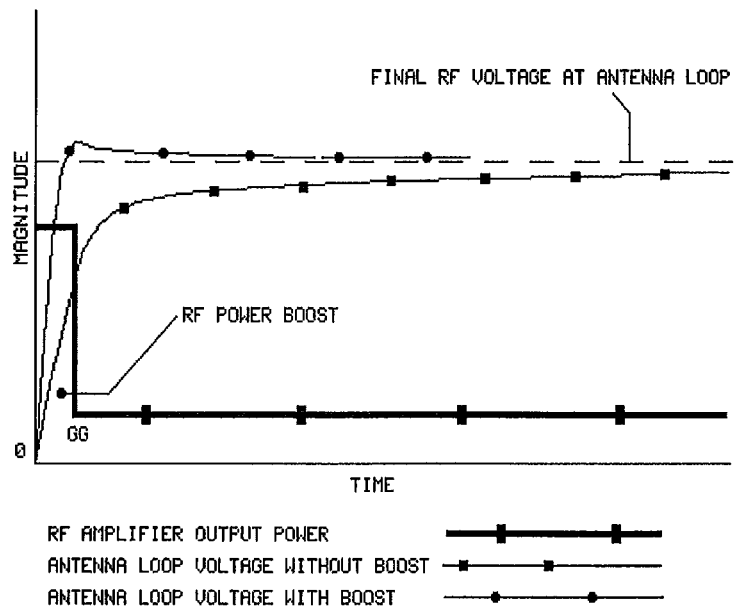
FIG. 7 depicts the effects of boosting RF power at the start of a sweep.
Figure 8:
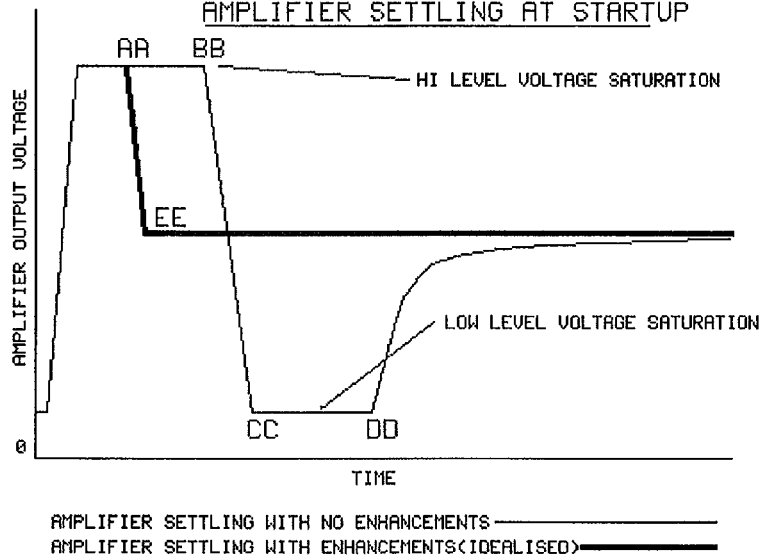
FIG. 8 depicts a typical amplifier settling period in an RFD reader.

A block diagram for the reader 112 of the embodiment of the invention is depicted in FIG. 6 of the drawings.

The reader 112 comprises a communications device in the form of a tuned loop reader antenna 114 operable to generate and transmit a signal to establish the RF transmission area or field and to receive a response signal from a tag 16. It thus functions as a transceiver and field generator.

The reader 112 comprises a controller having processing means operable for processing/executing instructions and managing the flow of data and information through the reader 112. For example, the processing means can be any custom made or commercially available processor, a central processing unit (CPU), a data signal processor (DSP) or an auxiliary processor among several processors associated with the reader 112. The processing means may be a semiconductor based microprocessor (in the form of a microchip) or a macroprocessor, for example.

In the embodiment described, the processing means comprises a reader microprocessor 118 operably coupled to a storage means, device or medium in the form of reader memory. In embodiments of the invention, the storage means, device or medium can include any one or combination of volatile memory elements (e.g., random access memory (RAM) such as dynamic random access memory (DRAM), static random access memory (SRAM)) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The storage medium may incorporate electronic, magnetic, optical and/or other types of storage media. Furthermore, the storage medium can have a distributed architecture, where various components are situated remote from one another, but can be accessed by the processing means. For example, the ROM may store various instructions, programs, software, or applications to be executed by the processing means to control the operation of the reader and the RAM may temporarily store variables or results of the operations.

Where the word "store" is used in the context of the present invention, it is to be understood as including reference to the retaining or holding of data or information both permanently and/or temporarily in the storage means, device or medium for later retrieval, and momentarily or instantaneously, for example as part of a processing operation being performed by the system 110.

The microprocessor 118 is operable, under control of executable instructions or software stored on the memory, to enable the reader 112 to perform operations or actions, as will be described in further detail below.

Particularly, the microprocessor 118 is operable, under control of the instructions, to: periodically switch the reader 112 from a first state to a second state in which the reader 112 is operable to determine an occurrence of a tag present event corresponding to the presence of a tag 16 within the field generated by the reader 112 and one or more other events; following determination of the one or more other events, return the reader 112 to the first state; and following determination of the tag present event, receive and store in the reader memory a representation of the data signal originating from the tag 16, process the representation to determine the data signal, and read the data of the determined data signal.

In the embodiment, the first state comprises a lower power mode of operation. In the lower power mode of operation, is a default or standard condition of the reader 112, less energy is used by the reader 112, making it a micro-power reader. The second state comprises a higher power mode of operation. In the higher power mode of operation, more energy is used by the reader 112 than when it is in a lower power mode of operation. The invention is not limited in this regard, and in alternative embodiments may have alternative and/or additional states or modes of operation.

The one or more other events include a tag 16 not being present in the field.

As will be described in further detail, the microprocessor 118 controls the reader 112 to stop generating the RF field (when in the lower power mode of operation) and, after a period of time, re-start generating the RF field (when switched to the higher power mode of operation). To determine the occurrence of a tag present event or of the one or more other events, the microprocessor 118 is operable, under control of the instructions, to control the reader 112 to generate the RF field to initiate an electronic sweep or scan to detect, receive and store in the reader memory a representation of at least a portion of a signal detected in the field over a duration of time (corresponding to the duration of the sweep or scan). It subsequently processes the detected signal representation via a one or more analysis stages to determine whether it corresponds to a tag 16 being, or likely being, present in the RF field (and hence a tag present event) or to a tag 16 not being present in the RE field (and hence one or more other events). If the determination is made at each analysis stage that there is, or is likely, a tag present, then the sweep is continued, and ultimately a representation of the data signal originating from the tag 16 is received, stored and processed, and the data of the determined data signal read. If, during the analysis stages, the determination is made that one or more other events has occurred (i.e. there is no tag 16 present in the RF field) then the reader 112 is switched to the lower power mode of operation and the RF field (and the resulting sweep) is terminated.

Processing of the detected signal representation signal data varies according to analysis being undertaken. Preferably, the detected signal representation is built up or created dynamically, on the fly. In this manner, it is a representation of a signal that is presently being detected in the field.

In the embodiment described, the analysis includes analysis comprising a start-up waveform anomaly analysis using an analytical weighting system, a typical bit waveform analysis (also using an analytical weighting system), and analysis by an on-the-fly bit data checking system. The invention is not limited in this regard, and in alternative embodiments may have alternative and/or additional stages of analysis.

Preferably, one or more reference representations each corresponding to a respective representation being expected on the occurrence of the tag present event or the one or more other events are stored in the reader memory and accessible during analysis to determine the occurrence of the tag present event or the one or more other events.

The one or more reference representations may comprise: a first reference representation corresponding to an expected representation when a tag 16 is present in the field; a second reference representation corresponding to an expected representation of an event comprising a tag not being present in the field; and one or more other reference representations corresponding to respective representations of one or more other events occurring in the field.

The reference representations may be temporarily or permanently stored in the reader memory.

The expected representations for each of the one or more reference representations may correspond to a duration of time commencing from when the field is generated (i.e. RF on) and extending a complete data transmission time. This duration of time may correspond to the sweep period or sweep.

Software modules are stored on the memory that, when executed, provide instructions to the microprocessor 118 to perform the operations, processing and analysis as described.

Software in the set of modules, or any set of instructions or programs for the system 110, can be written in any suitable language, as are well known to persons skilled in the art. The software can be provided as stand-alone applications, via a network, or added as middle-ware, depending on the system requirements.

In alternative embodiments of the invention, the modules may be implemented in hardware. In such a case, for example, the modules may be implemented with any one or a combination of the following technologies, which are each well known in state of the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

The microprocessor 118 is further operable to provide a stable 125 KHz reference frequency from an onboard PWM output. This is amplified by an un-modulated RF reader amplifier ("power amplifier") 120 and used, to power the reader antenna 114 at a frequency of 125 KHz.

Current in the loop of the reader antenna 114 generates an inductive AC field around the loop. Also connected to the loop of the reader antenna 14 is detection means in the form of an envelope detector 122 which may also be referred to as an RF demodulator. In the embodiment described, the envelope detector 122 comprises a diode detector. The diode detector is operable to detect signal modulation of a signal received via the reader antenna 114 to recover the signal waveform envelope. The components of the reader 112 are operably connected such that any signal modulation that appears on the tuned loop of the reader antenna 114 will be detected and amplified.

Output from the envelop detector 22 is presented to amplification means in the form of a detector amplifier 124 such that detected waveforms or signals are amplified and not limited. To receive and store in the memory of the reader 112 the representation of the data signal (which may be a combination of respective data signals) of a detected waveform, the output of the detector amplifier 124 is presented to an analog-to-digital converter ("ADC") 126 operable to sample the analog signal outputted from the detector amplifier 124 into digitised samples each having a digital value. The samples (digital values) are stored in RAM memory of the reader 112 in digital form. Therefore, in the embodiment described, the representation comprises the samples.

A power supply (not shown) provides power to the components of the reader 112, which are all operably connected or coupled via appropriate circuitry to enable the reader 112 to perform functions as described, and are housed in a suitable housing or casing (not shown).

The above description relates to components required to read a tag 16. In the embodiment, the reader 112 additionally comprises a digital-to-analog converter ("DAC") 127. As will be described in further detail, the microprocessor 118 is operable, under control of the instructions, to analyse a previously stored representation of the signal data taken without a tag 16 being present in the RF field (the second reference representation), and send a stream of instructions to the DAC 127 to cause the DAC 127 to generate a cancelling analog signal that is injected at a suitable point or stage in the detector amplifier 124 of the reader 112 to prevent or at least ameliorate, signal voltage saturation in the detector amplifier 124 when the RF field is first applied. Particularly, the DAC 127 is operable to generate the analog signal from digital values generated and stored in the reader memory and inject the generated analog signal into the detector amplifier 124 at an appropriate point or stage.

Basic Operation

The reader 112 is constructed using normal, conventional low power design techniques well known to persons skilled in the art. From this base, or starting point, additional methods are used to reduce the power consumption. In the embodiment, this reduction is in the order of a further three and a half orders of magnitude, and the additional methods advantageously do not overly degrade the user friendliness, in particular the waiting time and reader range.

As previously described, the default or baseline operating state for the reader 112 is the lower power mode of operation. When the reader 112 is in this condition, the RF power amplifier 120, the detector amplifier 124, the ADC 126, the DAC 127, and all non-essential subsystems (not shown) of the reader 112, are deactivated and powered off. That is, they are normally "off".

In the embodiment, the main functions of the microprocessor 118 are also powered down when in the lower power mode, with the exception of a micro power watchdog timer, which is operable and used to "wake up" the microprocessor 118 to enter the higher power operating mode at the completion of a period of time spent in the lower power mode of operation. Any very low power timer could be used in alternative embodiments. Alternatively, the microprocessor could be clocked at a very low speed while a delay routine is called.

Accordingly, the reader 112 of the embodiment only energises periodically, otherwise it sleeps in order to conserve power.

When the timer period is complete, the watchdog timer is operable to create an interrupt and cause a software wake up routine to be run or executed to switch the reader 112 to the higher power mode of operation. When this occurs, the clock of the microprocessor 118 is started, the RF power amplifier 120, the analog amplifier 124, the ADC 126, the DAC 127, and all of the subsystems that were previously powered down, are activated and powered on. It is preferred that the ADC 126 and the DAC 127 are activated and powered up last, after a small delay, because they are quick to settle, resulting advantageously in a minor power saving.

Once the reader 112 has been powered up for a long enough period to detect and read a tag 16, if present in the RF field, it will be powered down. During the power on period, the RF demodulator 122 is operable to demodulate signals received via tuned antenna loop 114 and amplifier 124 and amplify these signals, whilst the ADC 126 is operable to convert the amplifier 124 output into digital samples that are stored in memory. Although the digital samples may first be manipulated and transformed according to the processing and analysis undertaken (as later described), the reader 112 can employ, or modify, one of many methods known to the art, to extract the tag data from the stored digital samples.

In the described embodiment, a typical tag 16 will store 64 bits in its memory (i.e. the shift register 36) and will send these bits continuously, repeating every 32 ms. Tag 16 and most popular tags or cards do not employ a cyclic redundancy check ("CRC") error detecting code, so reader 112, in common with many readers, is operable to read a tag 16 three times to crosscheck the data. Thus 96 ms must be allowed to read a tag 16 and be sure that there are no data errors. In addition, reader 112 must be powered up at least 2 times a second or the user will wait too long for a tag 16 to be read.

This mandates a duty cycle of 4:1. As hereinbefore described, during the periodic off period the amplifier 124, the ADC 126, the DAC 127, the RF power amplifier 120 and all non-essential subsystems are powered down, the microprocessor 118 is switched to a low clock rate, or a watchdog timer is used. This advantageously reduces the standing current (energy used) to a bare minimum. In this way the power consumption may be reduced by a factor of 5. More power reduction is desirable. In fact, another 2 orders of magnitude of power reduction is desirable and can be achieved by the embodiment of the invention.

Conventionally, it is normal to test for a tag 16 in the field by recovering 64 bits and checking that the bits follow the expected tag data format. However, waiting for 64 bits to be recovered before a decision is made on the presence of a tag 16 will take a lot of time and consume too much power. For this reason, in the embodiment, a data check is preferably made at a much earlier stage.

In a preferred embodiment, to perform the data check analysis, the tag data bits (of the data associated with a tag 16) are recovered dynamically, on the fly, during the electronic sweep. The data associated with each tag 16 has a 9 bit header followed by data arranged in 4 bit nibbles with a fifth parity bit. The bits, including the header bits are checked as they are recovered. If the header or any of the parity bits have an error, or an impermissible bit timing is received, the sweep is aborted. Otherwise, the sweep is allowed to continue until the whole of the tag data has been checked three times.

It is advantageous to examine the early portion of the tag 16 data signal transmission, immediately the sweep starts, but there is a major problem. At that time, detector amplifier 124 has not yet settled. It will be appreciated that a combination of operational amplifiers, especially those that are capacitor coupled, will exhibit a start-up curve. As is known to persons skilled in the art, a start-up curve can take many forms including a single asymptotic rise or a bounce or several bounces with rapid rise times that may be voltage saturated at some point before finally levelling off. This is due, at least in part, to capacitors charging and the RF demodulator 122 receiving a huge rise of voltage as the RF driver amplifier 120 delivers more and more power into the tuned antenna 114 circuit when the higher power operating mode is entered. Use of a non-return to zero image detector would give less of a bump but would not solve the problem completely.

Figure 3:
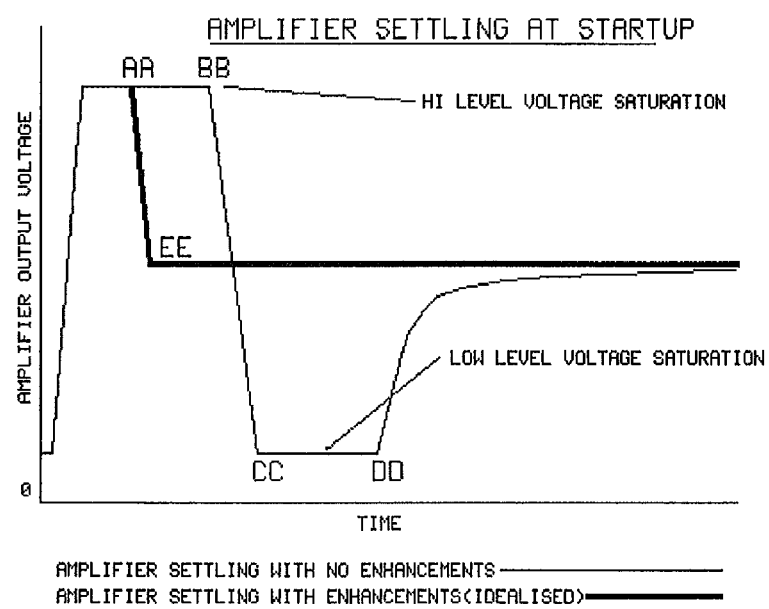
FIG. 3 depicts a typical amplifier response on start-up.

The first few data bits are transmitted by the tag 16 just after the start up, once the higher power mode of operation is entered, at a time of amplifier bounces, extreme swings and periods of deep saturation. FIG. 3 of the drawings shows a typical output waveform of the final amplifier in an RFID system during a start-up period. The violent swings in the output waveform generated due to the power build-up of the tuned loop antenna 114 can be thousands of times greater than the signal due to or arising from the tag 16. What is worse, the signal is completely lost during the periods of high level and low level voltage saturation at the final amplifier making it all but impossible to get any data recovery at an early stage.

Conventionally, the only recourse is to wait for the amplifier to settle and wait a further period for a header followed by a minimum amount of tag data, which in this case is 5 bits, to be retrieved in order to determine if a tag 16 is or is not present. Altogether this may take 5-40 ms.

Anomaly Detector

As described previously, a first analysis stage undertaken to determine whether a tag 16 is present in the field, or not, comprises a start-up waveform anomaly analysis. This analysis may be performed by an anomaly detector implemented in software as an anomaly detector software module.

In this analysis stage, the solution is not to try looking for tag data bits but for anomalies in the detected amplified signal, immediately following the application of the RF field by the reader 112 that might indicate something is different, possibly because a tag 16 is present. If there are no anomalies, it is safe to assume that no tag 16 is present and immediately power down. Anomalies may consist, for example, of changes to the position and lengths of the saturation periods or changes to the speed of the transitions. These changes may be very small. In this first analysis stage in the embodiment, nothing can be gained from examination of the actual periods of saturation.

Settling times vary from amplifier design to amplifier design and can be expected to last from a few milliseconds to several tens of milliseconds. Settling times can also vary due to other factors, such as, for example, production spreads, however for any particular reader design, the shape and time of the settling period (with no tag 16 present in the field) will be substantially the same every time and will be repeated over and over again. Temperature fluctuations will tend to modify the curves but from cycle to cycle the curves will be substantially repeatable.

When a tag 16 is present during an RF field start up, the tag 16 will modulate the field. For reasons as hereinbefore described, tag data retrieval immediately following the start-up period is not possible.

As hereinbefore described, the reader 112 is operable to take high speed analog-to-digital samples, using ADC 126, of the demodulated and amplified signal. Because tiny changes are being observed, much smaller than is required to retrieve the normal tag data, a high speed, high resolution ADC is preferred, and is provided in the embodiment.

In the embodiment, at a convenient stage or time in a system set-up state prior to operation, the tuned loop reader antenna 114 is activated to generate the field for a period of time when there is no tag 16 present in the field (and hence no data signal originating from the tag 16). A representation of at least a portion of a signal detected in the field over the duration of time is received and stored in the reader memory as the second reference representation.

Particularly, prior to operation, a reference sweep waveform in the form of digitised samples is taken using the ADC 126 of the reader 112 during a period when a tag 16 is not present in the field and the reference sweep waveform is stored in the reader memory as the second reference representation. As will be described in further detail below, additional, temporary reference representation waveforms may be taken and stored in the reader memory. Preferable, the reference waveforms comprise 4,000 off 16 bit analog-to-digital samples taken 8 us apart for a complete 32 ms sweep.

In the embodiment, the anomaly analysis stage further comprises subtracting the detected signal representation (i.e. of present sweep) from the second reference representation (corresponding to a no-tag sweep) to generate a modified or resultant representation, and storing the resultant representation separately in the storage means. Preferably, the subtraction (and creation of the resultant representation) occurs dynamically, on the fly.

The resultant representation is then processed dynamically as it is being build up or created to determine at an early stage if the resultant representation is substantially zero, indicating that there is no tag 16 present in the field, or if the resultant representation is not substantially zero, indicating an anomaly in the field that may be related to the presence of a tag 16 in the field. If a determination is made that there is no tag 16 present in the field, then the reader 112 is switched to the lower power mode of operation and the sweep is aborted. If an anomaly is detected, then the detection of the present sweep is continued.

In this manner, after the reference waveform has been stored it may be used to produce further waveforms in digital form. When a sweep is initiated, the ADC 126 is operable to take samples at the same time points and from these subtract the corresponding samples in the reference waveform and the result, being the resultant representation, is stored in the reader memory. The resultant digitised waveform consists of only the differences between the reference sweep and the latest sweep.

It will be clear that if a tag 16 is not in the field, the resultant waveform will be substantially a flat line. However if a tag 16 is present in the RF field, then providing that the A-D resolution and speed is sufficient, the resultant waveform of subtraction will reveal even tiny departures in the waveform shape and these could be due to the contribution of signal arising from a tag 16 in the field. In the embodiment, it is critical in the analysis to examine the period immediately after the field is applied. The anomaly itself could be that a period of saturation has changed or the speed of a rapid transition has been subtly altered. In the embodiment, at this stage it will not be possible to determine what has caused the anomaly, so if any significant anomaly above those attributable to the noise floor is detected the RF sweep is allowed to continue.

Continuing the Anomaly Detection

While the anomaly (deviation from the expected start up curve) may be due to a tag 16 being present in the field, it may also be due to the occurrence of another event, such as, for example, a mains surge or interference. Once an anomaly has been detected the subsequent resultant subtraction waveform is analysed dynamically, on the fly, as the waveform is built up, in order to reach a conclusion as early as possible whether the anomaly has been caused by a tag 16 or something else, such as simply interference, for example. The resultant representation is further analysed as, it continues to be build up or created, to determine a cause of the anomaly.

If a determination is made that the anomaly was caused by interference (i.e. there is no RFID tag present in the field), then the reader 112 is switched to the lower power mode of operation and the sweep is aborted. If it is determined that the anomaly was likely caused by the presence of a tag 16 in the field, then the detection of the present sweep action is continued.

It will be appreciated that, in the embodiment described, the anomaly detection analysis stage serves a vital purpose because if every sweep were allowed to continue until data associated with a tag 16 was recognizable as such, up to an order or more power would be consumed.

In preferred embodiments of the invention, the microprocessor 118 of the reader 112 is operable, under control of the instructions, to perform a comparison analysis, wherein a detected signal representation for a current sweep is compared with both a reference representation and a detected signal representation from the immediately preceding sweep.

Also in preferred embodiments, the microprocessor 118 of the reader 112 is operable, under control of the instructions, to process the resultant representation as it is being build up or created, to perform a pattern detection analysis to determine if the resultant representation contains a prescribed pattern.

The prescribed pattern may be a typical or expected bit pattern for the type of tag 16 intended to be read. In such a case, the pattern detection analysis may comprise assigning a weighting of the closeness of a bit pattern match between a bit pattern of the resultant representation and the typical RFID tag bit pattern, and other factors including, for example, signal duration and signal magnitude, to determine if the resultant representation is indicative of noise (and that there is no tag 16 present in the field), or is indicative of a tag 16 being present in the field. If a determination is made that there is no tag 16 present in the field, then the microprocessor 118 is operable, under control of the instructions, to switch the reader 112 to the lower power mode of operation, terminating the sweep. If the analysis distinguishes the signal from noise, then the microprocessor 118 is operable, under control of the instructions, to continue the present sweep detection.

In the embodiment, after an anomaly has been detected, the sweep is extended and a weighting system module implemented in software is used to evaluate the signal data waveform after every A-D sample has been taken. Weightings are given according to the type of anomaly. If the anomaly is regarded as significant, the sweep is extended in accordance to the weighting given to the anomaly, until it is either identified as a tag 16 or interference. Weighting factors include amplitude and the wave shape. As the sweep progresses and detector amplifier 124 has settled more, the resultant waveform is compared with typical signal waveforms bit patterns of the type of tag 16 used. Again weightings are used and if the weightings are high, the sweep is extended.

At the point when the tag bit data is determined to be acceptable, and is at least above the system noise, the recovered data bits and where possible parities are checked against the specific tag format so that the sweep may be immediately aborted if a data error is detected.

In this regard, when it has been determined that it is likely that a tag 16 is present in the field, the resultant representation is processed, as it continues to be built up or created towards being a complete or full resultant representation, to further analyse the partial resultant to retrieve the data signal, and read the data of the determined data signal dynamically, on the fly, to determine if the data is corrupt. If a determination is made that the data is corrupt, then the reader 112 is switched to the lower power mode of operation and the sweep is aborted. If it is determined that the data is not corrupt, then the detection of the present sweep is continued until the full data of the tag 16 has been transmitted and a complete or full resultant representation formed corresponding to the RFID tag signal representation.

Some tags have an in-built start up delay that may be so great that it may appear that no tag 16 is present in the RF field. Such a tag 16 may still register as an anomaly because all tags 16 modify the field to at least some extent by, for example, drawing power or even just coupling to it. However detection is not guaranteed. To address this problem, in the embodiment described, the reader 112 is operable to also allot or allocate a longer RF duration time, that is, to establish the field for a longer duration of time, every several sweeps to make sure that tags 16 from various manufacturers have time to start transmitting and be detected. The down side to this is an associated slightly higher power consumption.

Preferably, once data associated with a tag 16 has been read, a typical or expected bit pattern for that tag 16 is created on the basis of the read data and stored in the reader storage. The microprocessor 118 is operable, under control of the instructions, to do this by sequencing the RFID tag signal data to the RFID tag bit sequence and normalizing the amplitude of the signal to generate an associated typical bit pattern, and storing the associated typical bit pattern in the reader storage. It may be stored temporarily, or as a replacement for an existing RFID typical bit pattern previously stored.

In the embodiment, the reader 112 is configured and operable to update the representations of bit patterns that are stored in the reader memory and used in the anomaly detection stage as described above. Once a tag 16 has been read and confirmed, the reader 112 is operable to create, in digital form, temporary waveform bit patterns associated with the tag 16 used by sequencing the tag signal data to the tag bit sequence, normalize the amplitude and store the patterns in the reader memory as either temporary bit patterns or as replacements to the existing bit patterns.

Bounce and Saturation Elimination Function

In preferred embodiments, the DAC 127 is operable to create or generate an output signal for injection at an appropriate stage or point of amplification to cancel to at least some extent undesirable effects, including intrinsic amplifier bounce and saturation that occur when the higher power mode of operation is entered, the field is generated and the amplifiers are activated. More preferably, the injected output signal will also cancel any or at least part of a contribution due to one or more stationary tags 16 being present in the field during construction of a reference representation.

In this regard, in a further mode, the reader 112 is configured and operable to use the DAC 127 to inject a correcting signal, at an early or intermediate stage of amplification, to eliminate, or at least greatly reduce, bounce and saturation and make tag detection possible at a very early stage.

To illustrate and explain this operation, it may be supposed, for example, that the detector amplifier 124 had bounce but no saturation effects. The microprocessor 118 is operable to store a waveform of a representation of a first initial sweep, taken without a tag 16 being present in the field, in reader memory, as hereinbefore described. On a subsequent sweep, the digital data from the first sweep is sequentially loaded into the DAC 127 to generate a voltage output that corresponds to the stored waveform at every point as the sweep progresses.

Figure 4:
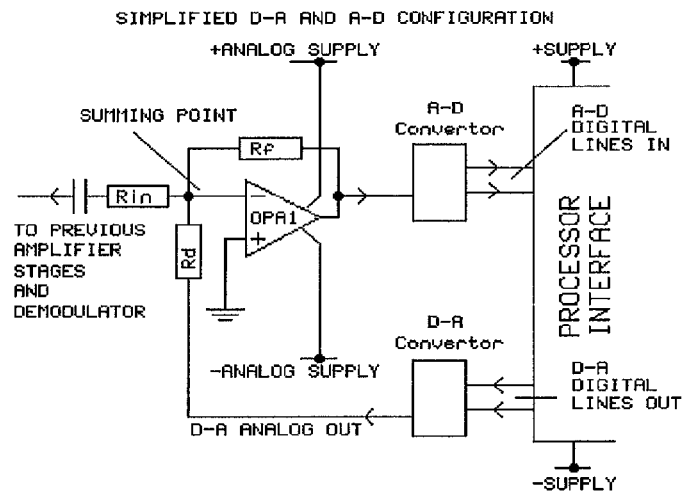
FIG. 4 depicts a simplified configuration of A-D and D-A configurations.

The output from the DAC 127 is fed back to a suitable point in the detector amplifier 124 to produce an opposite and equal signal to the signal from the present sweep. In the described embodiment, the virtual earth summing point of OPA1 via resistor Rd, as shown in FIG. 4, is used as the injection point. Assuming a tag 16 has not been placed in the field then, apart from a short indeterminate period at the start of the sweep, the output voltage of OPA1 will substantially be a level central line.

If a tag 16 is subsequently placed in the field, then only the contribution due to tag 16 will be available at the output of the detector amplifier 124. Without saturation this would be an instant solution.

In reality, influences such as bounce and saturation are both to be expected. The method hereinbefore described above will at least substantially eliminate the bounce in the embodiment but the actual feedback value required during the periods of saturation to counter and eliminate the saturation is indeterminate, at least on a first sweep. The first copy waveform will need to be modified, possibly greatly, at locations corresponding to voltage saturation.

So, in practice, in the embodiment described, the stored digital waveform is first reduced in magnitude by a factor approximately corresponding to the severity of the voltage saturation. If this were not done, the first copy waveform could get modified so much that it could become digitally saturated, for example, $0000 or $FFFF, at locations where voltage saturation had occurred.

A second sweep is then performed with the DAC 127 output connected and introducing a cancelling signal. If the final amplifier OPA1 output deviates from a level central line, then incremental (not proportional) changes are made to the first copy to counteract the deviation. It will be appreciated that in the saturated areas, the exact amount of correction required to the first waveform copy, to obtain a flat output line, is not known. The saturation could be slight or severe and there is no way of telling. To ensure system stability the first copy waveform is modified by small fixed amounts only, say an increment of 1 or a decrement of 1, whatever is appropriate in places that are not neutrally flat.

Further sweeps are made and the first waveform modified accordingly until the areas of saturation have been eliminated and the voltage of output amplifier OPA1 is substantially level and central over the main body of the sweep.

It is inevitable that the above method introduces some noise. However, the greater the speed and the resolution of the analog-to-digital and digital-to-analog converters and the greater the number of samples taken per sweep, the better the system will perform.

In alternative embodiments, the system 110 can be modified to allow proportional feedback on subsequent sweeps to modify the initial sweep. However, more attention is required to make the system stable in such a case. A high speed, high resolution, low noise pulse-width modulation ("PWM") with a suitable filter may be employed as an alternative to a conventional DAC.

It will appreciated that if a tag 16 is stationary in the field then this process will also completely remove the contributions of the tag 16 to the signal as if the tag 16 were not present.

Using a Lower Resolution DAC

It will also be appreciated that it may no longer be required to generate a resultant representation from the result of a stored reference waveform and the current waveform to correct the waveform since that function is now performed by the bounce and saturation elimination function above.

However, in embodiments of the invention, a further sweep could be performed and the resultant detected waveform representation stored in memory while the bounce and saturation elimination function is running, and be used to remove coarseness in the DAC 127 convertor resolution. A first coarse correction may be made by the bounce and saturation elimination function and a fine correction made by subtraction of the new reference. In this case a lower resolution DAC may be used.

Power Boost

Preferably, the signal amplification is operable to produce an increase in power (i.e. a power boost) at the start of a sweep.

In the embodiment, at the start of a sweep in the higher power mode of operation, as the RF voltage is building up, the RF demodulator 122 delivers a huge voltage surge to the detector amplifier 124 system. During this, internal coupling capacitors of the power amplifier 120 charge up and this contributes to the settling time.

It is advantageous to use a non-return to zero detector instead of a diode envelope demodulator, however the latter is economic and easily configured and the former is yet only a partial solution. The problem on the face of it will not go away, the input capacitor could be made smaller so it requires less charge but the RF continues rising for a relatively long time and the effect of lowering the capacitance on the settling time is only marginal.

However, if the RF power can be boosted for a short period of time, at the start up, the tuned antenna 114 can be quickly brought up to the working point. In fact, even an overshoot can be beneficial so that the charging current will actually reverse for a short period.

In this embodiment, a PWM 125 KHz reference is taken to the class D RF power amplifier 120 and the normal operating mark space ratio is 1:4. To increase the power delivery at start of a sweep this is changed to a 1:1, increasing the RF power output. The mark space ratio can also be controlled to reduce bounce and saturation.

This method is particularly effective when used in conjunction with the digital-to-analog feedback system hereinbefore described.

Logarithmic Amplification

In embodiments of the invention, logarithmic amplifiers may be used, that is to say amplifiers that are not linear, to reduce saturation effects and hard saturation may be avoided. In such embodiments, the anomaly detection module described above may be used and may perform better because, for example, heavy saturation is avoided and the areas that were formerly saturated can contribute to the anomaly detection.

When used with the digital-to-analog feedback system, hereinbefore described above, there may be less advantage using logarithmic amplifiers.

Updating for Environmental Changes

As previously described, changes in temperature can modify the start-up waveform. The reader 112 of the embodiment described has provision to periodically extend the sample period when there are no anomalies present and incrementally perform changes to the recorded reference start up waveform data so that it tracks the start-up waveform for the current temperature. Bearing in mind that the tag signal can be several orders of magnitude less than the voltage change due to settling during the start-up period it is advantageous to track the changes due to temperature fluctuations especially if the card is distant from the reader and the signal is low.

Parallel Anomaly Detection

In parallel with comparing the demodulated start-up representation waveform to the updated and stored reference-'start-up representation waveform, the microprocessor 118, under control of the instructions, is also operable to compare the current start-up waveform with the previous few sweeps to detect for anomalies. This forms a backup system and also provides the reader 112 the means to gather data for the reference sweep after manufacture in cases when, for example, no reference data has been loaded into the reader memory.

Taking a Reference Sweep with a Fixed Tag(s)

In preferred embodiments of the invention, once data of a tag 16 present in the field has been read, the microprocessor is operable, under control of the instructions, to perform a stationary tag detection analysis to determine if the read tag 16 is stationary in the field. This may be implemented by comparing a plurality of sequential detected signal representations over time. If there is substantially no charge in the sequentially detected signal representations (indicating that the read RFID tag is stationary in the field), then the microprocessor 118 is operable, under control of the instructions, to store, preferably temporarily, in the reader memory a representative one of the sequentially detected signal representations as a third reference representation corresponding to a stationary RFID tag present event.

To determine if one or more additional tags 16 are introduced into the field, and to read their associated data, whilst a first read tag 16 is stationary in the field, the microprocessor may be operable, under control of the instructions, to perform the processes as hereinbefore described using the third reference representation rather than the second reference representation.

In the embodiment, the reader 112 is operable to modify its mode of operation. A moving tag 16 will modulate the field according to factors including distance from the reader 112 and the tags orientation, so the signal levels will normally change in such circumstance. Furthermore, most tags 16 will start modulating the field at the same instant and with the same bit pattern after the field is applied. If, after a predefined number of sweeps the same tag 16 is detected again and again, and the digitised signal data is substantially unchanged, an assumption is made that the tag 16 has been permanently left in the reader field and is stationary. From this point on the digitised tag signal data is used as a temporary start up reference and the digitised signal data from the whole sweep is stored in the reader memory. Until the stationary tag 16 is moved, its effect on (contribution made to) the start waveform will not be detected as an anomaly and will not trigger a sweep, although any new tag 16 to come into range of the field will.

When the digitised signal data from a new tag 16 entering the field is subtracted from the temporary reference data taken from the stationary tag 16, the new tag 16 will be read as if it were the only tag 16 in the field. In this way the reader 112 can advantageously protect itself from drawing too much or unnecessary power when a tag 16 is left in the field, by accident or otherwise.

Reference Sweep with Multiple Fixed Tags

Reader 110 also has provision that if the start-up shows an anomaly, and the signal is still present after the normal settling time, then if after several sweeps the digitized signal data in the sweeps remains substantially the same yet no tag 16 is detected, then is assumed that several tags 16 are stationary in the field even if they cannot be read. (It should be noted that most popular card readers cannot read more than one card at a time and indeed cannot read any cards at all if several cards are in the field at the same time). The digitized signal waveform is then used by the microprocessor 118, under control of the instructions, as a temporary start up reference and the digitized signal data from the whole sweep is stored in the reader memory.

Once again, when the digitized signal data from a new tag 16 entering the field is subtracted from the temporary reference data taken from the stationary tag 16, the new tag will be read as if it were the only tag in the field and reader 110 can protect itself from drawing too much power when a tag 16 is left in the field, by accident or otherwise.

It can be seen that combinations of these operating modes can be used to protect the reader 112 from continually performing full scans and consuming high power, as well as enabling the reader to read a new tag 16, even if a tag 16 or tags 16 have been left accidentally or otherwise in the reader field.

If DAC 127 is in use then the reader 112 is operable to alternatively create a temporary feedback cancellation waveform using the same method used to remove the bounce and saturation. The contributions from any tag(s) 16 will also be removed.

Removal of the Contribution of a Powerful Tag Saturating the Amplifier

The contributions of a tag 16 left so close to the loop antenna 114 that the tag signal saturates the detector amplifier 124 will be treated by the microprocessor, under control of the instructions, the same as the start-up saturation if it is present when the D-A cancellation waveform is created and the contribution of the tag 16 will be removed completely, allowing tags 16 subsequently entering the field to be read.

CRC Check

Preferably, the data associated with the tag 16 comprises at least one error-detecting code, and an additional error-detecting code. The error-detecting code may comprise or be modelled on at least one of Manchester encoding, including 64 bit Manchester encoding, or a similar type such as one employing bi-phase modulation encoding. The additional error-detecting code may comprise a cyclic redundancy check (CRC) either within the data itself or encoded by rotation of the ID string during programming time.

The tags 16 used in the embodiment employ simple parity data checks and the signal data can easily be corrupted by noise or electrical interference. As hereinbefore described, simple tag parity checks are not adequate so data of the tag 16 is read three times just to confirm the data.

In a further method some of the data bits are used to hold a data CRC check. In such an embodiment, the reader 112 only reads the tags 16 once and performs a CRC check on the data to confirm its validity. The read action is thus three times quicker than normal and the power consumption reduced still further.

This method works well. However, as will be described in further detail below, some reader users require the full data amount, in this case 64 bits, and the advantage of this common, tag is that a user can use the same tag on several systems in a linked fashion, for example, door entry, photo copier, canteen and so on. Some of these systems may wish to use the full 40 bits of user data.

String Rotation Modulation

Preferably, the microprocessor 118, under control of the instructions, is operable to determine rotation of the data string of data associated with the tag 16 by timing the first transmission of data and/or from the position of a header in the string.

As hereinbefore described, allotting bits for a CRC check in addition to the existing parity checks works Well. The tag 16 can be read three times quicker and the reader 112 uses less power, however it means less bits may be used for the actual tag data. Some users may not like this. The type of tag 16 used in this embodiment is a 64 bit card, of which 9 bits form a header, there are 10 of 4 bits of data nibbles, 10 horizontal parity bits, 4 vertical parity bits and a further bit that is always a zero bit. It is more advantageous if the CRC check is implemented in such a way that the full 40 bits of data are preserved and the tag 16 still works seamlessly with other tag readers. The problem, of course, is where the extra bits come from.

Conventional card readers for this type of tag recover 64 bits and determine if within those bits there is a unique header, in this case a series of nine '1's. According to the card format, any series of nine '1's must be the header, so no matter where this occurs in a 64 bit portion of recovered data, the nine must indicate the header. It will be noted that the data is endlessly repeated and so the 64 bits will wrap around. The extra bits for the data could be introduced by adding bits on to the 64 bits in some way, say by sending 128 bits, but this would mean that the tag ID would no longer repeat every 64 bits. Other types of readers (that may not be in accordance with embodiments of the invention) may or may not be able to read the tag 16.

The solution is a novel use of string rotation to gain extra information. As explained above, this tag system endlessly repeats the 64 bit tag ID. There is in this sense no start or end to the transmission. However, when the field is first applied, some cards, particularly reprogrammable cards, start transmission at a particular point in the 64 bits tag ID string. In normal use it does not matter where the transmission starts, indeed early tags for this tag system tended to start up randomly at any point in the 64 bit tag ID string, since it is not a system parameter and is irrelevant. Once the tag is in the RF field and endlessly repeating, it is of no concern how the tag started up.

It is the convention to program tags with the header starting at bit 1 and then proceed with the associated data blocks. However, the header could be placed anywhere in the 64 bit tag ID and the bits wrapped around. Once the tag is operating it does not matter, it endlessly cycles and will indistinguishable from any other tag for this system and is available to be read by any other tag reader. It will be noted that the tag ID bits can be rotated 64 positions.

To achieve low power, the reader 112 of the embodiment described regularly interrupts the RF field. A tag that is predisposed to starting the transmission at a particular position will start transmission at the same point in the ID string. In this embodiment, after the data has been assessed as acceptable via the anomaly detector module and the sweep continued, the reader 112 recovers 64 bits of tag ID string and determines where the header is and what rotation has been performed on the tag ID string when the tag 16 was programmed. There are 64 possible rotation positions and this equates to 6 bits of added information, enough for a six bit CRC check. Advantageously, the user or customer is at liberty to choose their full amount of data and the tags 16 are available to be read on any reader for this system. It will be appreciated that the extra 6 bits of information could be used for any purpose.

It will also be appreciated that the extra 6 bits of information recovered are particularly reliable because they cannot be easily be corrupted. In fact they are linked to the position of the header and every single parity bit. Once the basic data format has been confirmed the extra six bits are almost guaranteed to be correct, making these bits highly suitable for a CRC check.

Figure 9:
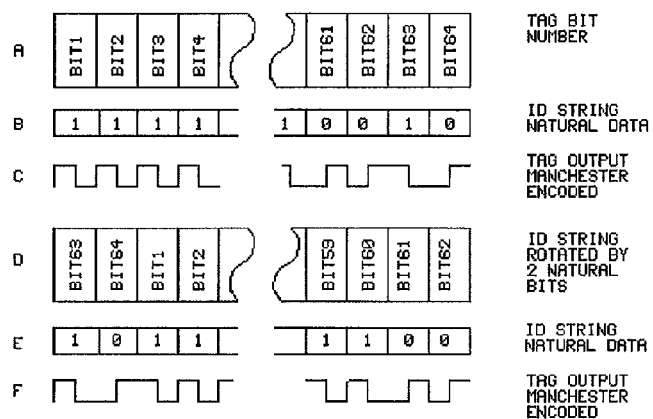
FIG. 9 depicts how tag data string can be rotated in a Manchester modulated card.

FIG. 9 of the drawings show the basic form of tag ID string rotation. 'A' shows the bit sequence from 1 to 64 in a Manchester encoded tag. A typical tag data is shown in 'B' and the associated tag Manchester encoded output is shown in 'C'. The relative bit positions after a clockwise rotation of 1 position is shown in 'D', the associated natural data from it shown in 'E' and the associated tag output after Manchester encoding is shown in 'F'.

ID strings in tags employing Manchester encoding can only be rotated 1 data bit at a time. This limits the amount of extra information that can be added to the tag. However, the above method can yet be extended to fractional bit rotation by using pseudo code that simulates Manchester encoding while still keeping the behavior of a 64 bit tag. For example, using a tag platform of 256 bits, employing direct modulation and pseudo code to simulate Manchester encoding and programming each bit four times sequentially and increasing the data rate four times, will in use, appear to be a normal 64 bit Manchester encoded tag in every respect but which may be programmed to have 256 bits of rotation. The start of the RF field can be used as an absolute reference to determine the bit rotation. In this case an extra 8 bits will be recovered.

Figure 10:
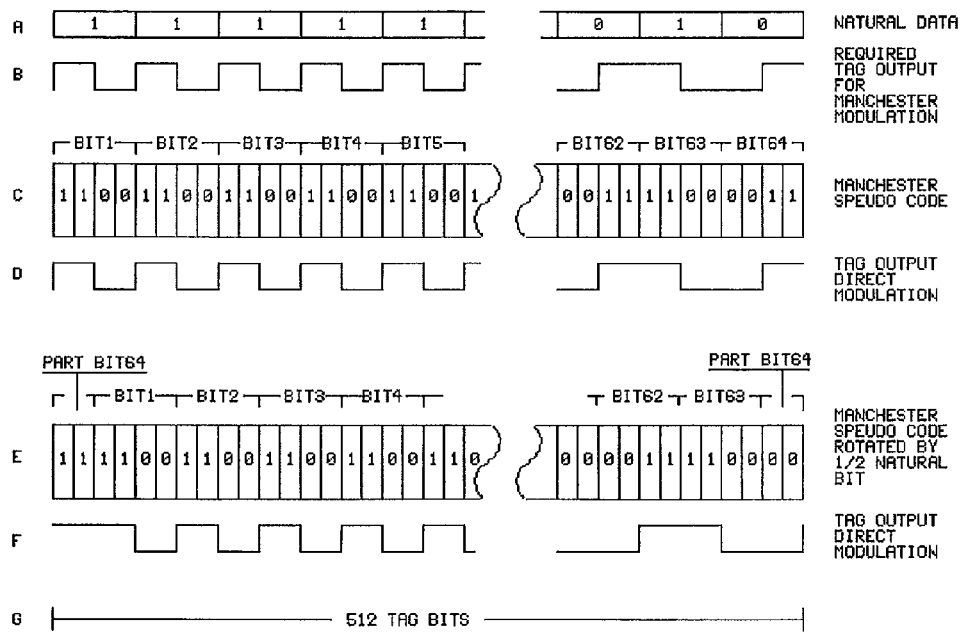
FIG. 10 depicts how fractional rotation of the data string can be achieved using pseudo code and direct modulation.

FIG. 10 in the drawings show a method using pseudo code with direct modulation to simulate Manchester encoding that allows a maximum rotation of 256 places, equivalent to an extra 8 bits of data. The typical natural tag data is shown in 'A' and the associated Manchester encoded output modulation is shown in 'B'.

'C' shows how data emulate Manchester coding using direct modulation. A 256 bit card is used and the data rate is set four times as fast. The simulated Manchester code is shown in 'D' and the output is the same in all respects to a normal 64 bit Manchester encoded tag. FIG. 10, 'E' shows the internal data rotated clockwise 2 places and 'F' shows the associated tag output.

The preferred embodiment of the invention describes a popular 64 bit system, however it will be appreciated that a person skilled in the art may use a similar method to extract additional bits for tag systems with larger or smaller capacities, say 32 bit or 512 bits, using either Manchester encoded modulation or simulated Manchester encoding using pseudo code and direct modulation as described above.

Whilst a low frequency RFID reader has been described, it will be appreciated that the same techniques may be employed in RFID systems employing higher frequencies.

The embodiment of the invention provides an RFID proximity reader that runs for 1000 days from a single CR2477 coin cell. This represents a power reduction of 4,000 times over conventional readers and allows RFID technology to make inroads into diverse new applications.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

The invention claimed is:

1. A reader for reading data, the data being associated with a radio frequency identification ("RFID") tag and carried by a data signal originating from the RFID tag, the reader comprising processing means and storage means, the storage means having instructions stored thereon, whereby the processing means is operable, under control of the instructions, to:

periodically switch the reader from a first state to a second state;

wherein, when the reader is in the second state, the reader is operable to determine an occurrence of a tag present event corresponding to the presence of an RFID tag within an RF field generated to activate an RFID tag to transmit a respective data signal carrying data associated with the RFID tag, and one or more other events;

following determination of the one or more other events, return the reader to the first state; and following determination of the tag present event, receive and store in the storage means a representation of the data signal originating from the RFID tag, process the RFID tag signal representation to determine the data signal, and read the data of the determined data signal; and, the reader further comprising an RF field generator operable to generate the RF field, and wherein the processing means is operable, under control of the instructions, to control the RF field generated by the RF field generator, and wherein the control comprises activating the RF field generator for a duration of time when there is no RFID tag present in the RF field; and, wherein the processing means is further operable, under control of the instructions, to receive and store in the storage means a representation of at least a portion of a signal detected in the RF field over the duration of time as a second reference representation corresponding to an expected representation of an event comprising an RFID tag not being present in the RF field, and to dynamically subtract the detected signal representation of a present sweep from the second reference representation to generate a resultant representation, and to store the resultant representation separately in the storage means; and, wherein the processing means is further operable, under control of the instructions, to process the resultant representation as it is being created, to determine at an early stage if the resultant representation is substantially zero, indicating that there is no RFID tag present in the RF field, or if the resultant representation is not substantially zero, indicating an anomaly in the RF field that may be related to the presence of an RFID tag.

2. A reader in accordance with claim 1, wherein the first state comprises a lower power mode of operation, and the second state comprises a higher power mode of operation.

3. A reader in accordance with claim 1, wherein the one or more other events include an RFID tag not being present in the RF field.

4. A reader in accordance with claim 1, wherein to determine the occurrence of the tag present event or the one or more other events, the processing means is operable, under control of the instructions, to:
receive and store in the storage means a representation of at least a portion of a signal detected in the RF field over a duration of time; and
process the detected signal representation.

5. A reader in accordance with claim 4, wherein the detected signal representation is built up or created dynamically.

6. A reader in accordance with claim 4, wherein processing the detected signal representation comprises analysing the detected signal representation.

7. A reader in accordance with claim 4, wherein the processing means comprises one or more analysis modules operable to perform the analysis of the detected signal representation.

8. A reader in accordance with claim 7, wherein one or more reference representations, each corresponding to a respective expected representation being expected on the occurrence of the tag present event or the one or more other events, are stored in the storage means and accessible by the one or more analysis modules to determine the occurrence of the tag present event or the one or more other events.

9. A reader in accordance with claim 8, wherein the one or more reference representations comprise: a first reference representation corresponding to an expected representation when an RFID tag is present in the RF field; a second reference representation corresponding to an expected representation of an event comprising an RFID tag not being present in the RF field;
and one or more other reference representations corresponding to respective representations of one or more other events occurring in the RF field.

10. A reader in accordance with claim 8, wherein the expected representations for each of the one or more reference representations correspond to a duration of time commencing from when the field is generated and extending a complete data transmission time or sweep period or sweep.

11. A reader in accordance with claim 1, wherein the representation(s) comprise a waveform or samples of a waveform.

12. A reader in accordance with claim 1, wherein the control comprises periodically activating and deactivating the field generator according to whether the reader is in the first state or the second state.

13. A reader in accordance with claim 1, wherein if a determination is made that there is no RFID tag present in the RF field, the processing means is operable, under control of the instructions, to switch the reader to the first state, and if an anomaly is detected, the processing means is operable, under control of the instructions, to continue the detection.

14. A reader in accordance with claim 13, wherein if an anomaly is detected, the processing means is operable, under control of the instructions, to further analyse the resultant representation as it continues to be created, to determine a cause of the anomaly.

15. A reader in accordance with claim 14, wherein if a determination is made that the anomaly was caused by interference, the processing means is operable, under control of the instructions, to switch the reader to the first state, and if a determination is made that the anomaly was likely caused by the presence of an RFID tag in the RF field, the processing means is operable, under control of the instructions, to continue the detection.

16. A reader in accordance with claim 1, wherein the processing means is operable, under control of the instructions, to perform a comparison analysis, wherein a detected signal representation for a current sweep is compared with both a reference representation and a detected signal representation from the immediately preceding sweep.

17. A reader for reading data, the data being associated with a radio frequency identification ("RFID") tag and carried by a data signal originating from the RFID tag, the reader comprising processing means and storage means, the storage means having instructions stored thereon, whereby the processing means is operable, under control of the instructions, to:
periodically switch the reader from a first state to a second state;
wherein, when the reader is in the second state, the reader is operable to determine an occurrence of a tag present event corresponding to the presence of an RFID tag within an RF field generated to activate an RFID tag to transmit a respective data signal carrying data associated with the RFID tag, and one or more other events;
following determination of the one or more other events, return the reader to the first state; and,
following determination of the tag present event, receive and store in the storage means a representation of the data signal originating from the RFID tag, process the RFID tag signal representation to determine the data signal, and read the data of the determined data signal; and,
wherein once data of an RFID tag present in the RF field has been read the processing means is operable, under control of the instructions, to perform a stationary tag detection analysis to determine if the read RFID tag is stationary, the stationary tag detection analysis comprising comparing a plurality of sequential detected signal representations over time, and if there is substantially no charge in the sequentially detected signal representations, indicating that the read RFID tag is stationary in the RF field, then the processing means is operable, under control of the instructions, to store, in the storage means a representative one of the sequentially detected signal representations as a third reference representation corresponding to a stationary RFID tag event.

18. A reader for reading data, the data being associated with a radio frequency identification ("RFID") tag and carried by a data signal originating from the RFID tag, the reader comprising processing means and storage means, the storage means having instructions stored thereon, whereby the processing means is operable, under control of the instructions, to:
periodically switch the reader from a first state to a second state;
wherein, when the reader is in the second state, the reader is operable to determine an occurrence of a tag present event corresponding to the presence of an RFID tag within an RF field generated to activate an RFID tag to transmit a respective data signal carrying data associated with the RFID tag, and one or more other events;
following determination of the one or more other events, return the reader to the first state; and
following determination of the tag present event, receive and store in the storage means a representation of the data signal originating from the RFID tag, process the RFID tag signal representation to determine the data signal, and read the data of the determined data signal; and, the reader further comprising an RF field generator operable to generate the RF field, and wherein the processing means is operable, under control of the instructions, to control the RF field generated by the RF field generator, and wherein the control comprises activating the RF field generator for a duration of time when there is no RFID tag present in the RF field; and, wherein the processing means is further operable, under control of the instructions, to receive and store in the storage means a representation of at least a portion of a signal detected in the RF field over the duration of time as a second reference representation corresponding to an expected representation of an event comprising an RFID tag not being present in the RF field, and to dynamically subtract the detected signal representation of a present sweep from the second reference representation to generate a resultant representation, and to store the resultant representation separately in the storage means; and, wherein the processing means is further operable, under control of the instructions, to process the resultant representation as it is being build up or created, to perform a pattern detection analysis to determine if the resultant representation contains a prescribed pattern.

19. A method for reading data, the data being associated with a radio frequency identification ("RFID") tag and carried by a data signal originating from the RFID tag, the method comprising:

periodically switching from a first stage to a second stage;

in the second stage, determining an occurrence of a tag present event corresponding to the presence of an RFID tag within an RF field generated to activate an RFID tag to transmit a respective data signal carrying data associated with the RFID tag, and one or more other events;

following determination of the one or more other events, returning to the first stage; and following determination of the tag present event, receiving and storing a representation of the data signal originating from the RFID tag, processing the RFID tag signal representation to determine the data signal, and reading the data of the determined data signal; and, the method further comprising controlling the RF field generated, wherein the control comprises activating the RF field for a duration of time when there is no RFID tag present in the RF field; and, receiving and storing a representation of at least a portion of a signal detected in the RF field over the duration of time as a second reference representation corresponding to an expected representation of an event comprising an RFID tag not being present in the RF field, and dynamically subtracting the detected signal representation of a present sweep from the second reference representation to generate a resultant representation, and storing the resultant representation separately; and, processing the resultant representation as it is being created, to determine at an early stage if the resultant representation is substantially zero, indicating that there is no RFID tag present in the RF field, or if the resultant representation is not substantially zero, indicating an anomaly in the RF field that may be related to the presence of an RFID tag.

* * * * *